United States Patent
Subramanian et al.

(10) Patent No.: US 11,604,672 B2
(45) Date of Patent: Mar. 14, 2023

(54) OPERATIONAL HEALTH OF AN INTEGRATED APPLICATION ORCHESTRATION AND VIRTUALIZED COMPUTING SYSTEM

(71) Applicant: VMware, Inc., Palo Alto, CA (US)

(72) Inventors: Aparna Subramanian, Cupertino, CA (US); Mark Russell Johnson, McKinleyville, CA (US); Carl Scott Ballenger, Colorado Springs, CO (US)

(73) Assignee: VMware, Inc., Palo Alto, CA (US)

( * ) Notice: Subject to any disclaimer, the term of this patent is extended or adjusted under 35 U.S.C. 154(b) by 237 days.

(21) Appl. No.: 16/838,710

(22) Filed: Apr. 2, 2020

(65) Prior Publication Data
US 2021/0311765 A1    Oct. 7, 2021

(51) Int. Cl.
*G06F 9/455* (2018.01)

(52) U.S. Cl.
CPC ......... *G06F 9/45558* (2013.01); *G06F 2009/45591* (2013.01); *G06F 2009/45595* (2013.01)

(58) Field of Classification Search
CPC ....... G06F 9/45558; G06F 2009/45591; G06F 2009/45595
See application file for complete search history.

(56) References Cited

U.S. PATENT DOCUMENTS

| | | | |
|---|---|---|---|
| 9,418,455 B1 * | 8/2016 | Wong | G06F 11/3006 |
| 10,191,778 B1 * | 1/2019 | Yang | H04L 67/1023 |
| 10,528,367 B1 * | 1/2020 | Liu | G06F 9/4498 |
| 10,778,539 B1 * | 9/2020 | Hussain | H04L 41/5054 |
| 10,938,782 B1 * | 3/2021 | Harland | H04L 63/10 |
| 11,188,376 B1 * | 11/2021 | Alexander | G06F 9/45545 |
| 2015/0347286 A1 * | 12/2015 | Kruglick | H04L 43/50 714/38.1 |
| 2017/0257286 A1 * | 9/2017 | Kitajima | H04L 43/0817 |

(Continued)

OTHER PUBLICATIONS

"Software-defined data center" https://en.wikipedia.org/wiki/Software-defined_data_center. (available Jan. 24, 2016) (hereafter Wikipedia_SDDC) (Year: 2016).*

(Continued)

*Primary Examiner* — Michael W Ayers
(74) *Attorney, Agent, or Firm* — Kim & Stewart LLP

(57) ABSTRACT

An example method of determining operational health of a virtualized computing system includes: monitoring, at a service executing in the virtualized computing system, a current configuration of a software-defined data center (SDDC) with respect to a desired state, the desired state including: a host cluster having hosts executing a virtualization layer thereon; a software-defined (SD) network deployed in the host cluster; shared storage accessible by the host cluster; a virtual infrastructure (VI) control plane managing the host cluster, the SD network, and the shared storage; and an orchestration control plane integrated with the virtualization layer and the VI control plane; determining a configuration status for the current configuration of the SDDC; monitoring, at the service, operational status of an application management system executing on the SDDC having the current configuration; and determining at least one measure of the operational health in response to the configuration status and the operational status.

20 Claims, 9 Drawing Sheets

(56) References Cited

U.S. PATENT DOCUMENTS

| | | | |
|---|---|---|---|
| 2017/0371693 A1 | 12/2017 | Corrie et al. | |
| 2018/0006881 A1* | 1/2018 | Anandam | H04L 41/0876 |
| 2019/0173779 A1* | 6/2019 | Gruner | H04L 45/745 |
| 2019/0188107 A1* | 6/2019 | Alston | G06F 3/0482 |
| 2020/0106676 A1* | 4/2020 | Duda | H04L 41/0895 |
| 2020/0241754 A1* | 7/2020 | Bett | G06F 3/0619 |
| 2021/0026727 A1* | 1/2021 | Minehan | G06F 11/0751 |

OTHER PUBLICATIONS

Zoller, Chip. "Why Kubernetes on Virtual Machines", https://neonmirrors.net/post/2020-01/why-k8s-on-vms/. (available Jan. 17, 2020) (hereafter Zoller) (Year: 2020).*
"Pod overview", https://kubernetes.io/docs/concepts/workloads/pods/. Accessible Jun. 3, 2019 (Year: 2019).*
Ernst, E. et al. "Kata Containers Architecture," GitHub, Inc., 2019, 22 pages, URL: https://github.com/kata-containers/documentation/blob/master/design/architecture.md.
Kubernetes, "Monitor Node Health," Tasks, 2019, 10 pages, URL: https://v1-16.docs.kubernetes.io/docs/tasks/debug-application-cluster/monitor-node-health/.
VMWARE, Inc. "Overview of vSphere Integrated Containers," Product version: 1.5, 2019, 21 pages.
VMWARE, Inc. "vSphere Monitoring and Performance," Update 2, Apr. 11, 2019, 219 pages.
U.S. Appl. No. 16/751,529, filed Jan. 24, 2020, 48 pages.

* cited by examiner

| Guest Cluster 510 | | | Application 504 | Application 504 | Application 504 | | Custom Components 512 | Kubernetes System 514 |
|---|---|---|---|---|---|---|---|---|
| Native VMs 140 | VM(s) 130/140 | Pod VM(s) 130 | Native VMs 140 | Pod VM(s) 130 | Native VM(s) 140 | | Supervisor Kubernetes Masters 104 | |
| GCIS Objects 508 | | | | | | Image Registry 190 | VM(s) 130/140 | |
| Supervisor Namespace 506 | | Supervisor Namespace 506 | Supervisor Namespace 506 | Supervisor Namespace 506 | | Supervisor Namespace(s) 506 | | |
| Supervisor Cluster 101 | | | | | | | | |
| SDDC 502 | | | | | | | | |

FIG. 5

OPERATIONAL HEALTH OF AN INTEGRATED APPLICATION ORCHESTRATION AND VIRTUALIZED COMPUTING SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes. Containers in the same pod share the same resources and network and maintain a degree of isolation from containers in other pods. The pods are distributed across nodes of the Kubernetes system and an image cache is provided on each node to speed up pod deployment. In some cases, each node includes a host operating system (OS), such as Linux®, and a container engine executing on top of the host OS (e.g., Docker®) that supports the containers of the pod. In other cases, a Kubernetes system can execute on top of a virtualized computing system, which can include multiple host computers each having a hypervisor that supports execution of virtual machines (VMs).

Operational health is a measure of the functioning ability of the Kubernetes system. The Kubernetes system must be configured properly in order to be operational. In addition, the underlying infrastructure that support the Kubernetes system must be configured and functioning correctly. However, health information is generated by many disparate components, including the Kubernetes system and the various disparate components of the underlying infrastructure. It is desirable to provide a more centralized health monitor that can allow a user to identify health problems in the underlying infrastructure and/or the Kubernetes system in order to remediate the problems and bring the system back to the desired operational health state.

SUMMARY

In an embodiment, a method of determining operational health of a virtualized computing system includes: monitoring, at a service executing in the virtualized computing system, a current configuration of a software-defined data center (SDDC) with respect to a desired state, the desired state including: a host cluster having hosts executing a virtualization layer thereon; a software-defined (SD) network deployed in the host cluster; shared storage accessible by the host cluster; a virtual infrastructure (VI) control plane managing the host cluster, the SD network, and the shared storage; and an orchestration control plane integrated with the virtualization layer and the VI control plane; determining a configuration status for the current configuration of the SDDC; monitoring, at the service, operational status of an application management system executing on the SDDC having the current configuration; and determining at least one measure of the operational health in response to the configuration status and the operational status.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

FIG. 5 is a block diagram depicting a logical view of a virtualized computing system having applications executing therein according to an embodiment.

DETAILED DESCRIPTION

Techniques for determining operational health of an integrated application orchestration and virtualized computing system are described. In embodiments described herein, the virtualized computing system includes a cluster of physical servers ("hosts") referred to as a "host cluster." The host cluster includes a virtualization layer, executing on host hardware platforms of the hosts, which supports execution of virtual machines (VMs). A virtualization management server manages the host cluster, the virtualization layer, and the VMs executing thereon. The virtualization management server, together with storage and network management systems, forms a virtual infrastructure (VI) control plane of the virtualized computing system. The host cluster is the data plane, which supports execution of workloads in VMs to implement various applications. Together, host cluster(s) and VI control plane(s) comprise a software-defined data center (SDDC).

In embodiments, the virtualization layer of the host cluster and the VI control plane are integrated with an orchestration control plane that supports an application management system, such as a Kubernetes system. This integration enables the host cluster as a "supervisor cluster" that uses the hosts to implement both control plane nodes and worker nodes of a Kubernetes system. Kubernetes pods execute on the hosts as "pod VMs," each of which includes a kernel and container engine that supports execution of containers of a Kubernetes pod. In embodiments, the Kubernetes system of the supervisor cluster is extended to support custom objects in addition to pods, such as VM objects that are implemented using native VMs (as opposed to pod VMs). A VI administrator (VI admin) can enable a host cluster as a supervisor cluster and provide its functionality to development teams.

In embodiments, the virtualized computing system includes an operational health service (e.g., executing in the virtualization management server). The operational health service monitors both configuration status of the SDDC, and operational status of the Kubernetes system. The configuration status is a measure of whether the SDDC has been configured according to a desired state model of the supervisor cluster. The desired state model is a configuration of compute, network, storage, and control plane that supports the Kubernetes system. The operational status is a measure of the Kubernetes system's ability to deploy applications on the worker nodes (e.g., pods on pod VMs, applications on native VMs) under control of the Kubernetes control plane executing on the control nodes. In embodiments, the operational heath is determined by first considering the configuration status of the SDDC and then further quantified by the operational status of the Kubernetes system. These and further advantages and aspects of the disclosed techniques are described below with respect to the drawings.

Figure 1:
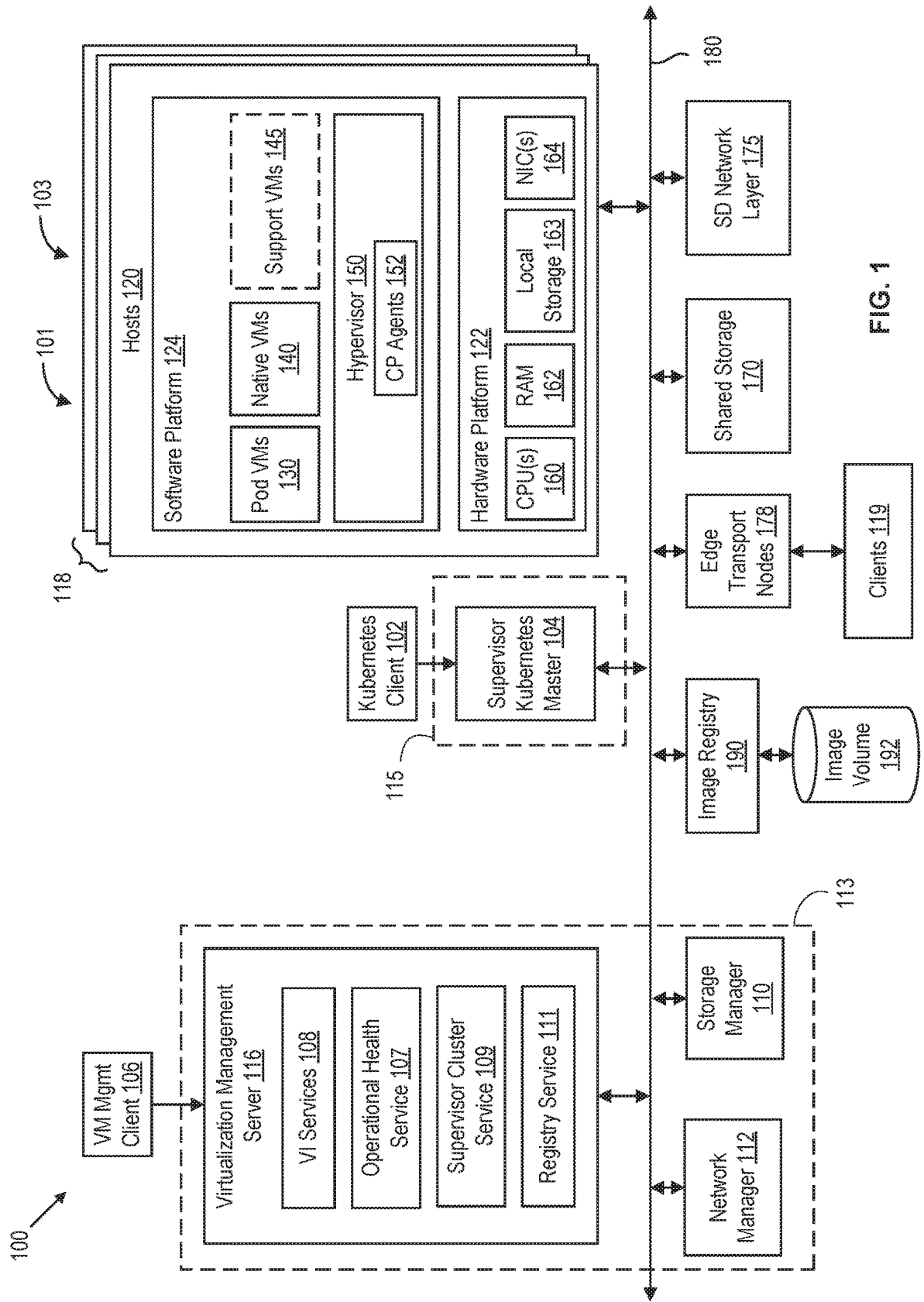
FIG. 1 is a block diagram of a virtualized computing system in which embodiments may be implemented.

FIG. 1 is a block diagram of a virtualized computing system 100 in which embodiments may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (VSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed One example of hypervisor 150 that may be configured and used in embodiments described herein is a VMware ESXi™ hypervisor provided as part of the VMware vSphere® solution made commercially available by VMware, Inc. of Palo Alto, Calif. In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of orchestration control plane 115 executing in hypervisor 150 (referred to as a pod VM controller). An example of pod VM 130 is described further below with respect to FIG. 2. Some native VMs 140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., the public Internet). Edge transport nodes 178 can include a gateway/router between the internal logical networking of host cluster 118 and the external network. Edge transport nodes 178 can be physical servers or VMs. For example, edge transport nodes 178 can be implemented in support VMs 145 and include a gateway/router of SD network layer 175. Various clients 119 can access respective components in virtualized computing system through edger transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs a control plane (CP) agent ("CP agent 152") in hypervisor 150 to add a host 120 as a managed entity. Virtualization management server 116 logically groups hosts 120 into cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in cluster 118 may be one or many. Virtualization management server 116 can manage more than one host cluster 118.

In an embodiment, virtualization management server 116 further enables host cluster 118 as a supervisor cluster 101. Virtualization management server 116 installs additional CP agents 152 in hypervisor 150 to add host 120 to supervisor cluster 101. Supervisor cluster 101 integrates an orchestration control plane 115 with host cluster 118. In embodiments, orchestration control plane 115 includes software components that integrate an application management system, such as a Kubernetes system, with host cluster 118 and the VI control plane managing host cluster 118. By way of example, a Kubernetes system is described herein. In supervisor cluster 101, hosts 120 become nodes of the Kubernetes system. Virtualization management server 116 provisions one or more virtual servers as "master servers," which function as management entities and execute on control nodes of the Kubernetes system. In the embodiment of FIG. 1, supervisor cluster 101 includes a supervisor Kubernetes master 104 that functions as such a master server. For purposes of clarity, supervisor Kubernetes master 104 is shown as a separate logical entity. For practical implementations, supervisor Kubernetes master 104 can be implemented as VM(s) 130/140 in host cluster 118. Further, although only one supervisor Kubernetes master 104 is shown, supervisor cluster 101 can include more than one supervisor Kubernetes master 104 in a logical cluster for redundancy and load balancing. Orchestration control plane 115 includes custom controllers, custom plugins, scheduler extenders, and the like executing in supervisor Kubernetes master 104, as well as services executing in the VI control plane, which together enable the Kubernetes system to deploy applications on VMs 130/140 of host cluster 118.

In an embodiment, virtualized computing system 100 further includes storage manager 110. Storage manager 110 is a physical or virtual server that provisions virtual disks in shared storage 170 (including a VSAN formed from local storage 163) as independent and persistent volumes. That is, virtual disks that persist apart from the lifecycle of any VM or container. Various components can interact with storage manager 110 to provision persistent volumes, such as virtualization management server 116 and supervisor Kubernetes master 104. Storage manager 110 can operate independently from virtualization management server 116 (e.g., as an independent physical or virtual server). Alternatively, storage manager 110 can be a service in virtualization management server 116.

In an embodiment, virtualized computing system 100 further includes a network manager 112. Network manager 112 is a physical or virtual server that manages logical network services of SD network layer 175. In an embodiment, network manager 112 comprises one or more virtual servers deployed as VMs. Network manager 112 installs additional control plane agents 152 and data plane (DP) modules in hypervisor 150 to add a host 120 as a managed entity, referred to as a transport node. In this manner, host cluster 120 can be a cluster 103 of transport nodes. One example logical network platform that can be configured and used in embodiments described herein as network manager 112 and SD network layer 175 is a VMware NSX® platform made commercially available by VMware, Inc. of Palo Alto, Calif.

In an embodiment, system 100 further includes an image registry 190 and an image volume 192. As described herein, containers of supervisor cluster 101 execute in pod VMs 130. The containers in pod VMs 130 are spun up from container images managed by image registry 190. Image registry 190 manages images and image repositories stored on an image volume 192. Image volume 192 includes persistent storage provisioned from shared storage 170 for storing container images and container repositories.

Virtualization management server 116, network manager 112, and storage manager 110 comprise a virtual infrastructure (VI) control plane 113 for host cluster 118, shared storage 170, and SD network layer 175. Virtualization management server 116 can include operational health service 107, supervisor cluster service 109, registry service 111, and VI services 108. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure sufficient resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

Supervisor cluster service 109 enables host cluster 118 as supervisor cluster 101. Supervisor cluster service 109 deploys the components of orchestration control plane 115. Registry service 111 administers image registry 190. Registry service 111 is configured to perform lifecycle management of image registry 190, lifecycle management of projects, image registry health monitoring, project and image statistic collection, project and image replication, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

Figure 2:
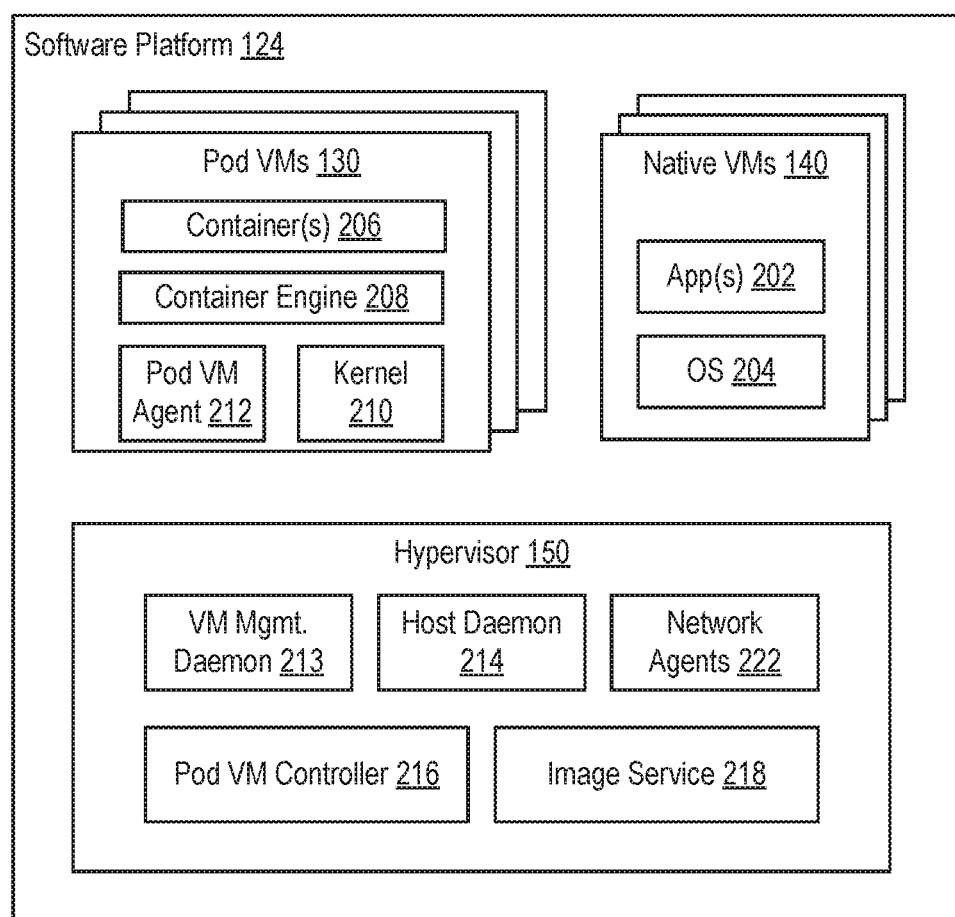
FIG. 2 is a block diagram depicting software platform according an embodiment.

FIG. 2 is a block diagram depicting software platform 124 according an embodiment. As described above, software platform 124 of host 120 includes hypervisor 150 that supports execution of VMs, such as pod VMs 130 and native VMs 140. In an embodiment, hypervisor 150 includes a NI management daemon 213, a host daemon 214, a pod N controller 216, an image service 218, and network agents 222. VM management daemon 213 is a control plane agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod N controller 216 is a control plane agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216.

Network agents 222 comprises control plane agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130 are omitted if host cluster 118 is not enabled as a supervisor cluster 101.

Figure 3:
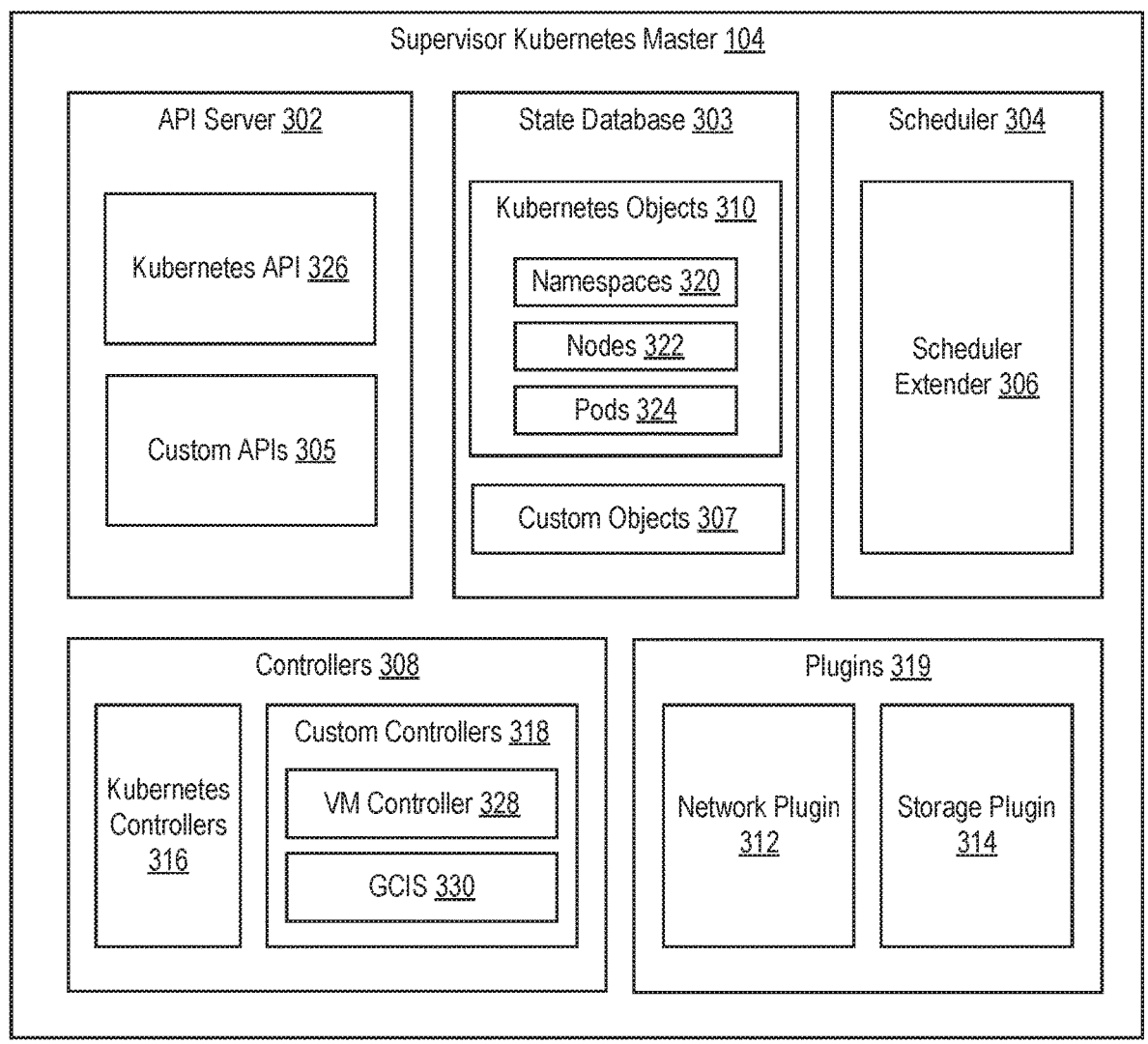
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, controllers 308, and plugins 319 API server 302 includes the Kubernetes API server, kube-api-server ("Kubernetes API 326") and custom APIs 305. Custom APIs 305 are API extensions of Kubernetes API 326 using either the custom resource/operator extension pattern or the API extension server pattern. Custom APIs 305 are used to create and manage custom resources, such as VM objects and guest cluster objects. API server 302 provides a declarative schema for creating, updating, deleting, and viewing objects.

State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state. Standard Kubernetes objects ("Kubernetes objects 310") include namespaces 320, nodes 322, and pods 324 among others. Custom objects 307 are resources defined through custom APIs 305 (e.g., VM objects, guest cluster objects). Namespaces 320 provide scope for objects. Namespaces are objects themselves maintained in state database 303. A namespace can include resource quotas, limit ranges, role bindings, and the like that are applied to objects declared within its scope. VI control plane 115 creates and manages supervisor namespaces for supervisor cluster 101. A supervisor namespace is a resource-constrained and authorization-constrained unit of multi-tenancy managed by virtualization management server 116. Namespaces 320 inherit constraints from corresponding supervisor cluster namespaces.

Controllers 308 can include, for example, standard Kubernetes controllers ("Kubernetes controllers 316") (e.g., kube-controller-manager controllers, cloud-controller-manager controllers, etc.) and custom controllers 318. Custom controllers 318 include controllers for managing lifecycle of custom objects 307. For example, custom controllers 318 can include a VM controller 328 configured to manage VM objects and a guest cluster interface software (GCIS) controller 330 configured to manage guest cluster objects. A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems.

Plugins 319 can include, for example, network plugin 312 and storage plugin 314. Plugins 319 provide a well-defined interface to replace a set of functionality of the Kubernetes control plane. Network plugin 312 is responsible for configuration of logical networking of SD networking 175 to satisfy the needs of network-related resources. Network plugin 312 cooperates with virtualization management server 116 and/or network manager 112 to implement the appropriate logical network resources. Storage plugin 314 is responsible for providing a standardized interface for persistent storage lifecycle and management to satisfy the needs of resources requiring persistent storage. Storage plugin 314 cooperates with virtualization management server 116 and/or storage manager 110 to implement the appropriate persistent storage volumes in shared storage 170.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods Scheduler 304 cooperates with scheduler extender 306, which interfaces with VM management server 116. Scheduler extender 306 cooperates with virtualization management server 116 (e.g., such as with DRS) to select nodes from candidate sets of nodes and provide identities of hosts 120 corresponding to the selected nodes. For each pod, scheduler 304 also converts the pod specification to a pod VM specification, and scheduler extender 306 asks virtualization management server 116 to reserve a pod VM on the selected host 120. Scheduler 304 updates pods in state database 303 with host identifiers.

Kubernetes API 326, state database 303, scheduler 304, and Kubernetes controllers 316 comprise standard components of a Kubernetes system executing on supervisor cluster 101. Custom controllers 308, plugins 319, and scheduler extender 306 comprise custom components of orchestration control plane 115 that integrate the Kubernetes system with host cluster 118 and VI control plane 113.

Figure 4:
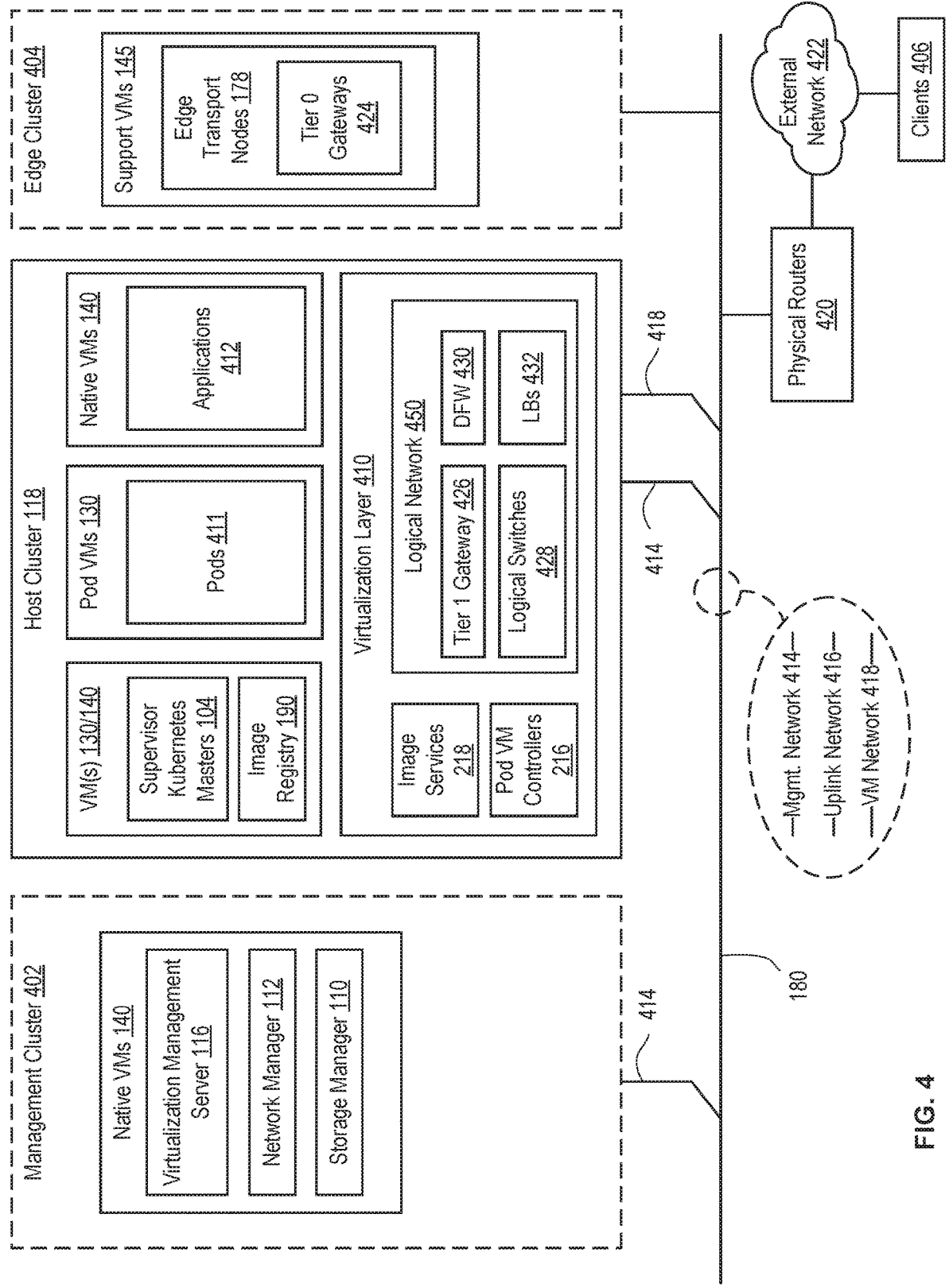
FIG. 4 is a block diagram depicting an implementation of a virtualized computing system according to an embodiment.

FIG. 4 is a block diagram depicting an implementation of virtualized computing system 100 according to an embodiment. In the example of FIG. 4, virtualization management server 116, network manager 112, and storage manager 110 are implemented in native VMs 140 of a management cluster 402. Management cluster 402 is a logical cluster of the VI control plane components. Management cluster 402 can be implemented in host cluster 118 or in a separate host cluster. Edge transport nodes 178 are implemented as native VMs (e.g., support VMs 145) in an edge cluster 404. Edge cluster 404 is a logical cluster similar to management cluster 402. Edge cluster 404 can be implemented in host cluster 118 or in a separate host cluster.

Host cluster 118 includes one or more VMs 130/140 that implement supervisor Kubernetes master 104 (or a cluster thereof) and image registry 190. Additional pod VMs 130 execute pods 411 (e.g., containerized applications), and additional native VMs 140 execute applications 412. A virtualization layer 410 of host cluster 118 (e.g., hypervisor 150 in each host 120) includes pod VM controllers 216 and image services 218 as described above (e.g., one pod VM controller 216 and image service 218 per host 120). Virtualization management server 116 and/or network manager 112 cooperates with agents installed in virtualization layer 410 to implement logical network 450 of SD network layer 175. Logical network 450 includes logical switches 428, that provide logical networks for VMs 130/140. A logical tier-1 gateway 426 provides layer-3 routing between logical networks. Distributed firewall (DFW) 430 provides firewall rules for each VM 130/140. Load balances (LBs) 432 provide load balancing services for VMs 130/140 (e.g., for supervisor Kubernetes masters 104). Logical tier-1 gateway includes an uplink connection to tier-0 gateways 424 executing in edge transport nodes 178.

Virtualized computing system 100 includes a plurality of isolated networks, including management network 414, uplink network 416, and VM network 418. For example, each network 414-418 can be implemented in a separate virtual local area network (VLAN) on physical network 180. Management cluster 402 is connected to management network 414. Host cluster 118 is coupled to both management network 414 and VM network 418. Edge cluster 404 is coupled to each of management network 414, uplink network 416, and VM network 418. Management network 414 carries management traffic between VI control plane 113 and control components, such as virtualization layer 410, supervisor Kubernetes master 104, and edge transport nodes 178. Uplink network 416 connects edge transport nodes 178 to physical routers 420, which provide an interface to an external network 422 (e.g., the public Internet). VMs 130/140 in host cluster 118 that connect to external network 422 do so through edge transport nodes 178. VM network 418 connects all VMs 130/140 in host cluster 118 and edge cluster 404. VM network 418 can be an overlay network that transports traffic between VMs using Layer-2 over Layer-3 tunnels. Example tunneling protocols include VXLAN and Geneve. Network manager 112 can orchestrate SD network layer 175 to provide various logical networks (logical switches 428) over VM network 418 using the tunnels.

Clients 406 include conventional components of a computing device (e.g., CPU, memory, storage, network interfaces, input/output interfaces and devices, etc.). Clients 406 are connected to external network 422. Clients 406 include the various clients of virtualized computing system 100 described herein, such as VM management client 106, Kubernetes client 102, and the like. Clients 406 access their respective systems through external network 422 and edge transport nodes 178.

FIG. 5 is a block diagram depicting a logical view of virtualized computing system 100 having applications executing therein according to an embodiment. In the embodiment, supervisor cluster 101 is implemented by an SDDC 502. SDDC 350 includes VI control plane 113 managing host cluster 118, SD network layer 175, and shared storage 170. Host cluster 118 includes a virtualization layer (e.g., hypervisors 150). A VI admin interacts with virtualization management server 116 to configure SDDC 350 to implement supervisor cluster 101. Supervisor cluster 101 includes orchestration control plane 115 integrated with SDDC 502. Orchestration control plane 115 includes software components supporting a Kubernetes system, such as services in virtualization management server 116 (e.g., supervisor cluster service 109, registry service 111), components in the virtualization layer (e.g., pod VM controllers 216, image services 218), and components executing in VMs 130/140 (e.g., supervisor Kubernetes masters 104 having custom components integrated with standard Kubernetes components).

The VI admin interacts with virtualization management server 116 to create supervisor namespaces 506. Each supervisor namespace 506 includes a resource pool, user-access constraints, and policies. The resource pool includes various resource constraints on supervisor namespace 506 (e.g., reservation, limits, and share (RLS) constraints). User-access constraints provide for which roles have which permissions in supervisor namespace 506 (e.g., allowing VI admin to create, manage access, allocate resources, view, and create objects; allowing DevOps to view and create objects, etc.) A user interacts with supervisor Kubernetes master 104 to deploy applications 504 on supervisor cluster 101 within scopes of supervisor namespaces 506. In the example, applications 504 execute on native VM(s) 140, pod VM(s) 130, or a combination of native VM(s) 140 and pod VM(s) 130. A guest cluster 510 is an application comprising a Kubernetes cluster that operates as a virtual extension of supervisor cluster 101. Additional applications can be deployed on guest cluster 510. Supervisor Kubernetes master 104 manages GCIS objects 508, which GCIS 330 manages to implement guest cluster 510. One or more supervisor namespaces 506 comprise system namespaces in which supervisor Kubernetes masters 104 and image registry 190 are deployed on VMs 130/140. Supervisor Kubernetes masters 104 implement the control plane for Kubernetes system 514. Custom software 512 (e.g., custom controllers 318, plugins 319, scheduler extender 306) integrate Kubernetes system 514 with the underlying SDDC 502.

Figure 6:
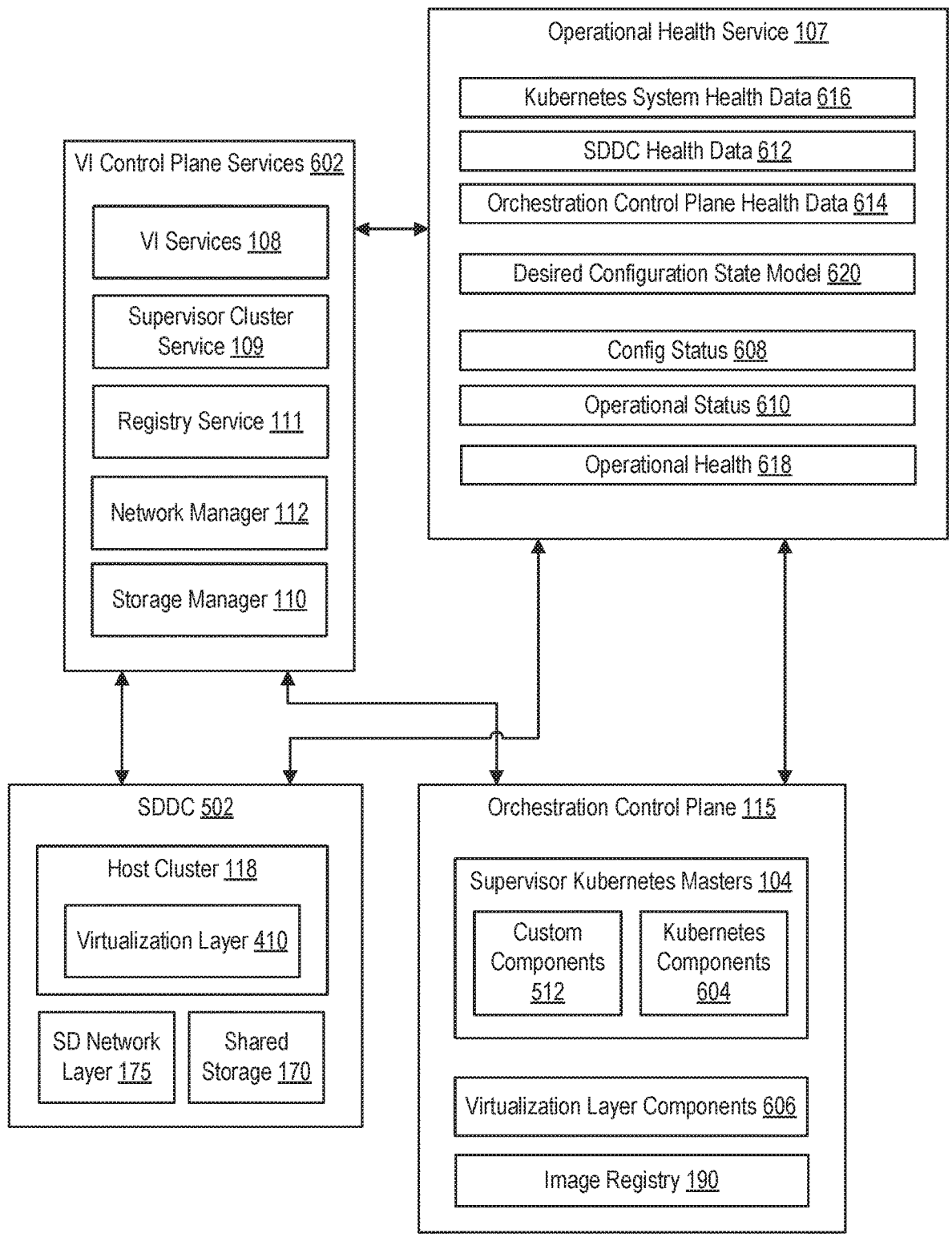
FIG. 6 is a block diagram depicting a logical view of managing operational health in a virtualized computing system according to an embodiment.

FIG. 6 is a block diagram depicting a logical view of managing operational health in a virtualized computing system according to an embodiment. Operational health service 107 executes in virtualized computing system 100, such as within virtualization management server 116. Operational health service 107 monitors SDDC 502 and VI control plane services 602 to obtain SDDC health data 612. SDDC health data 612 includes data indicative of configurations of host cluster 118, virtualization layer 410, SD network layer 175, and shared storage 170. SDDC health data 612 further includes configurations of services managing SDDC 502, such as VI services 108 (e.g., DRS, HA, virtualization daemon, network manager 112, storage manager 110, etc.). Operational health service 107 can obtain SDDC health data 612 from SDDC 502 directly or through VI control plane services 602 (or both). Example SDDC health data 612 includes cluster enablement status, network configurations, DRS and HA enablement, HA health, storage policy capacity/configurations, user permissions, and the like. In general, SDDC health data 612 includes data related to configurations of compute, storage, and network in SDDC 502, as well as configurations of VI control plane services 602 managing SDDC 502.

Operational health service 107 monitors orchestration control plane 115 and associated services in VI control plane services 602 (e.g., registry service 111 and supervisor cluster service 109) to obtain orchestration control plane health data 614. Orchestration control plane health data 614 includes data indicative of configurations of supervisor Kubernetes masters 104, virtualization layer components 606 (e.g., pod VM controllers 216 and image services 218), and image registry 190. Orchestration control plane health data 614 further includes configurations of services, such as registry service 111 and supervisor cluster service 109. Operational health service 107 can obtain orchestration control plane health data 614 from orchestration control plane 115 directly or through VI control plane services 602 (or both). Example orchestration control plane health data 614 includes configuration of custom components 512 and Kubernetes components 604, configuration of logical network 450 and edge transport nodes 178, configuration of virtual layer components 606, configuration of image registry 190, and the like.

Operational heath service 107 monitors Kubernetes system through supervisor Kubernetes masters 104 to obtain Kubernetes system health data 616. For example, operational health service 107 can obtain information from supervisor Kubernetes masters 104 by issuing kubectl get (node-|namespace) and kubectl describe (node|namespace) commands. These commands provide information related to nodes and namespaces in the Kubernetes system (e.g., whether nodes are ready, not ready, or in an unknown state; whether namespaces are active or terminating; etc.). In embodiments, operational health service 107 is configured to aggregate node health data to generate a cluster view (e.g., whether the cluster is ready to accept pods; whether there are warnings/errors; whether the cluster is not ready to accept pods; whether the cluster state is unknown; etc.).

Operational health service 107 can receive SDDC health data 612, orchestration control plane health data 614, and Kubernetes system health data 616 as messages. The messages can be obtained by request from monitored components, from a stream output by the monitored components, from a source that aggregates messages from monitored components (e.g., a VI control plane service 602), from logs generated by monitored components, and the like. The messages can have different types, such as informational messages, warning messages, and error messages.

Operational health service 107 compares SDDC health data 612 and orchestration control plane health data 614 against a desired configuration state model 620 for supervisor cluster 101. For example, a VI admin interacts with supervisor cluster service 109 to define a desired state for supervisor cluster 101, which includes a configuration of compute, storage, and networking to support the Kubernetes system. Operational health service 107 can obtain the desired state from supervisor cluster 109 to generate desired configuration state model 620. Operational health service 107 is configured to generate config status 608 based on whether the configuration of SDDC 502 and orchestration control plane 115 matches desired configuration state model 620. In embodiments, config status 608 includes a running state, an error state, and a configuring/removing state. A config status 608 in the running state indicates that the current configuration state of SDDC 502 and orchestration control plane 115 matches desired configuration state model 620. A config status 608 in the error state indicates that the current configuration state of SDDC 502 and orchestration control plane 115 deviates from desired configuration state model 620. A deviation can be determined based on presence of one or more error messages in SDDC health data 612 and/or orchestration control plane health data 614. A config status 608 of configuring/removing state indicates the configuration status of SDDC 502 and/or orchestration control plane 115 is ephemeral. For example, a user may be removing a configuration, adding a configuration, modifying a configuration, etc.

Operational health service 107 processes Kubernetes system health data 616 to determine operational status 610. Whereas config status 608 indicates whether supervisor cluster service 101 is configured correctly to support Kubernetes system, operational status 610 indicates whether Kubernetes system is operating correctly (e.g., whether the Kubernetes system is functioning to deploy pods/applications). In embodiments, operational status 610 includes a ready state, a not ready state, and an unknown state. Operational status 610 in the ready state indicates Kubernetes system is capable of deploying pods/applications. Operational status 610 in the not ready state indicates that Kubernetes system health data 616 has at least one error message and the Kubernetes system is not capable of deploying pods/applications. Operational status 610 in the unknown state indicates that supervisor Kubernetes masters 104 have not heard from the nodes (e.g., there is a disconnect between the nodes and supervisor Kubernetes masters 104).

Operational health service 107 can combine config status 608 and operational status 610 to generate operational health 618. Operational health 618 indicates an overall health status for supervisor cluster 101. In embodiments, operational health 618 has a ready state, a warning state, an unhealthy state, a pending state, and a disconnected state. To achieve the ready state, config status 608 must be running and operational status 610 must be ready. The messages in SDDC health data 612, orchestration control plane health data 614, and Kubernetes system health data 616 may include any message type as long as config status 608 is determined as running and operational status 610 is determined as ready. Operational health 618 is in the warning state if config status 608 is in the running state, operational health 610 is in the ready state, but there is at least one warning message in SDDC health data 612, orchestration control plane health data 614, and/or Kubernetes system health data 616. Operational health 618 can be in the unhealthy state under two conditions. (1) config status 608 is in the running state, but operational status 610 is in the not ready state, indicating that there is at least one error message in Kubernetes system health data 616; or (2) config status 608 is in the error state, indicating there is at least one error message in SDDC health data 612 and/or orchestration control plane health data 614. Operational health 618 is in the pending state when config status 608 is in the configuring/removing state. Operational health 618 is in the disconnected state when operational status 610 is in the unknown state.

Operational health service 107 is configured to present operational health 618, operational status 610, and/or config status 608 to the user through virtualization management server 116. Operational health service 107 can also present information messages, warning messages, and/or error messages that resulted in the current state of config status 608, operational status 610, and/or operational health 618. The user can then attempt to remediate the identified warnings/errors to bring config status 608 to running, operational status 610 to ready, and operational health to ready.

Figure 7:
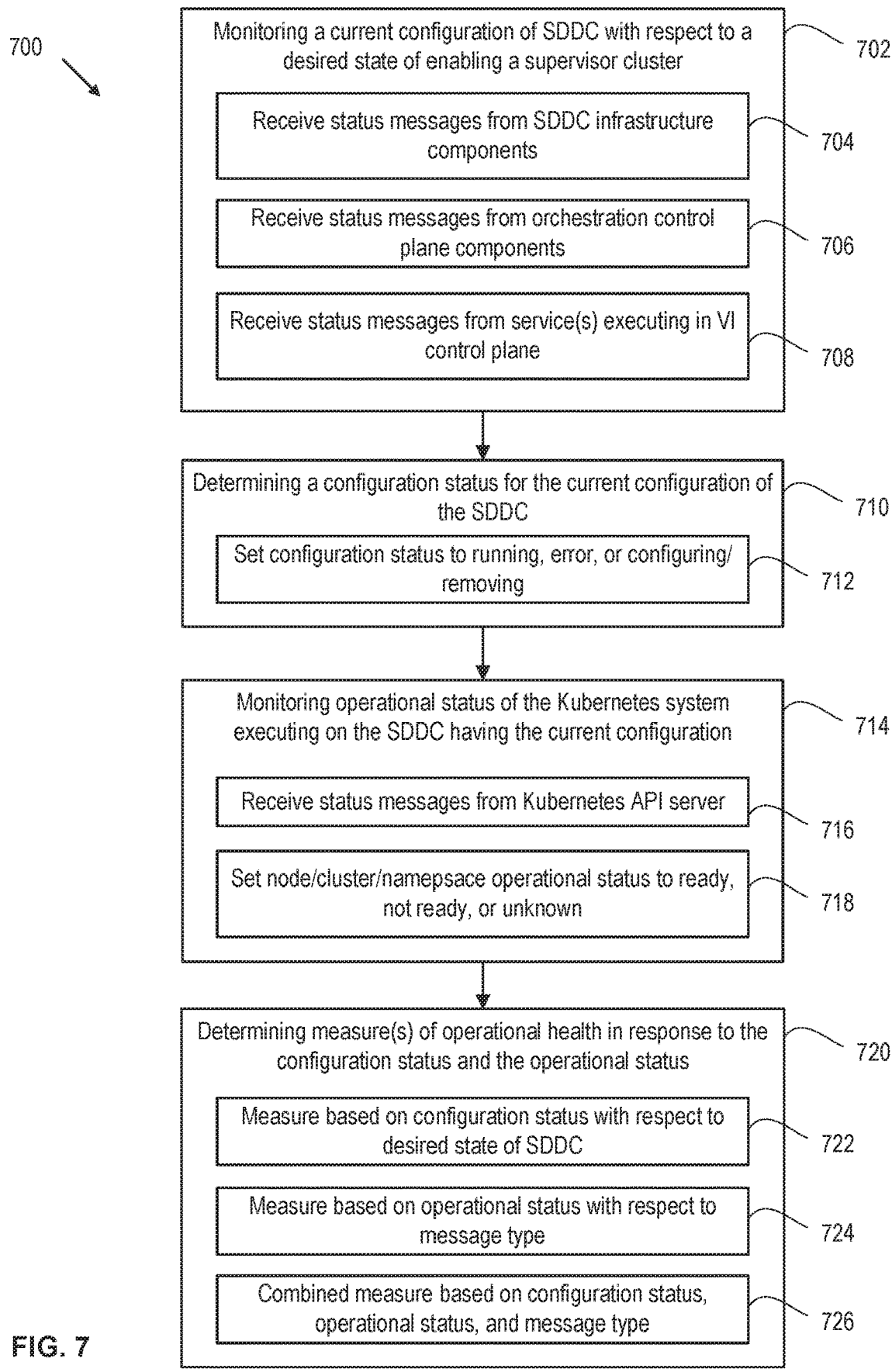
FIG. 7 is a flow diagram depicting a method of determining operational health of a virtualized computing system according to an embodiment.

FIG. 7 is a flow diagram depicting a method 700 of determining operational health of a virtualized computing system according to an embodiment. Method 700 can be performed by operational health service 107 executing on CPU, memory, storage, and network resources managed by a virtualization layer (e.g., a hypervisor) or a host OS.

Method 700 begins at step 702, where operational health service 107 monitors a current configuration of SDDC 502 with respect to a desired state of enabling supervisor cluster 101 (e.g., desired state configuration model 620). In embodiments, at step 704, operational health service 107 receives status messages from SDDC infrastructure components (e.g., compute, storage, and network components). At step 706, operational health service 107 receives status messages from orchestration control plane components (e.g., supervisor Kubernetes master 104, pod VM controllers 216, image services 218). At step 708, operational health service 107 receives status messages from service(s) executing in VI control plane 113 (e.g., VI services 108).

At step 710, operational health service 107 determines a configuration status (config status 608) for the current configuration of SDDC 502. In embodiments, at step 712, operational health service 107 sets the configuration status to running, error, or configuring/removing states depending on comparison of the current configuration with the desired configuration. An example of step 710 is described below with respect to FIG. 8.

At step 714, operational health service 107 monitors operational status of the Kubernetes system on SDDC 502 having the current configuration. In embodiments, operational health service 107 receives status messages from API server 302 of supervisor Kubernetes master 104 (e.g., node information, namespace information). At step 718, operational health service 107 sets node/cluster/namespace operational status to ready, not ready, or unknown based on the status messages. An example of step 714 is described below with respect to FIG. 9.

At step 720, operational health service 107 determines measure(s) of operational health in response to the configuration status and the operational status. In embodiments, at step 722, operational health service 107 determines a measure of operational health based on configuration status with respect to the desired state of the SDDC. At step 724, operational health service 107 determines a measure of operational health based on operational status of Kubernetes system with respect to message type (e.g., information, warning, error messages for ready, not ready, unknown operational status). At step 726, operational health service 107 determines operational health based on a combination of configuration status and operational status in combination with message type (e.g., operational health of ready, warning, or unhealthy).

Figure 8:
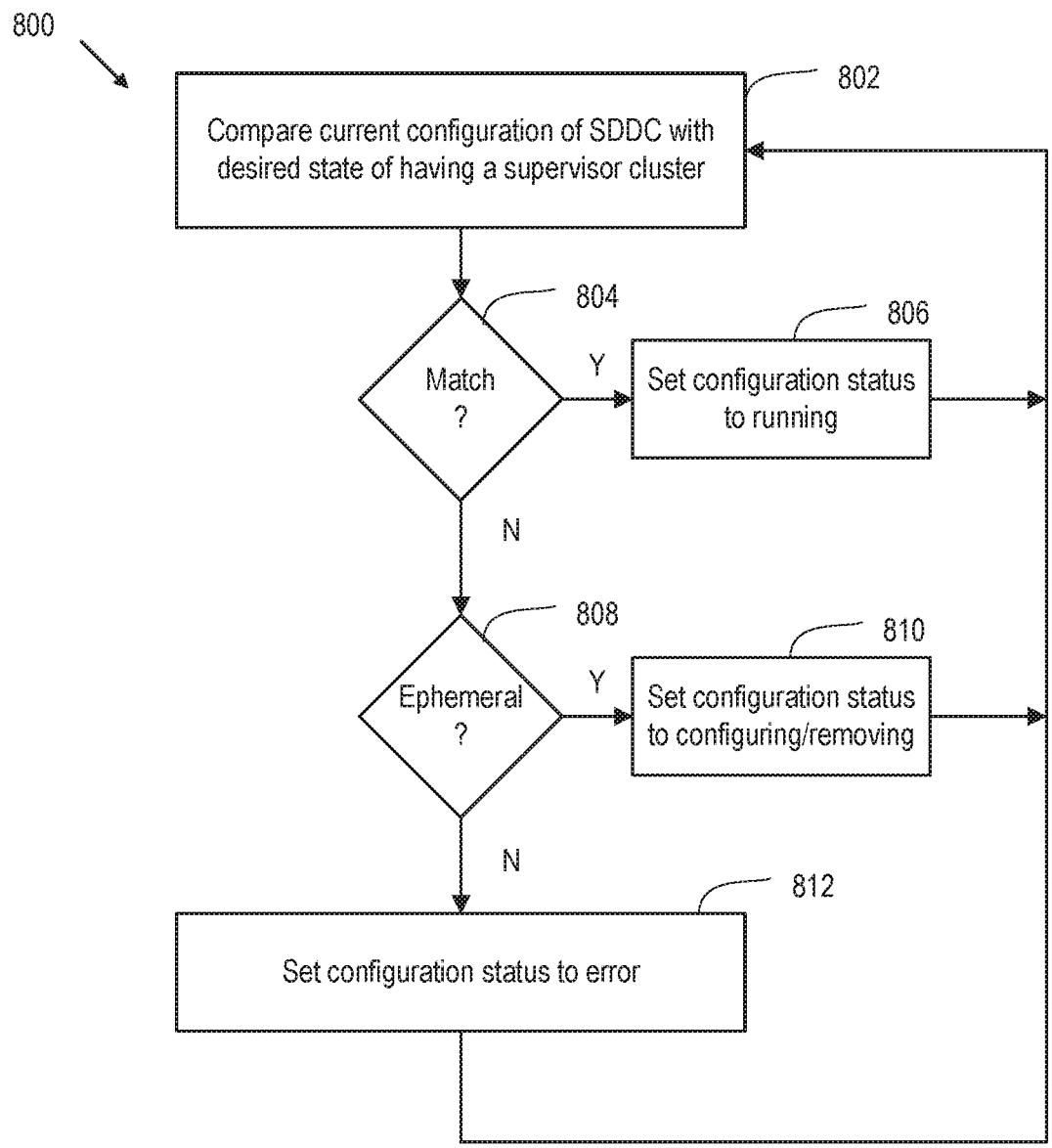
FIG. 8 is a flow diagram depicting a method of determining configuration status of an SDDC for enabling a supervisor cluster according to an embodiment.

FIG. 8 is a flow diagram depicting a method 800 of determining configuration status of an SDDC for enabling a supervisor cluster according to an embodiment. Method 800 can be performed by operational health service 107 executing on CPU, memory, storage, and network resources managed by a virtualization layer (e.g., a hypervisor) or a host OS.

Method 800 begins at step 802, where operational health service 107 compares a current configuration of SDDC 502 with a desired state of having supervisor cluster 101 (e.g., desired configuration state model 620). At step 804, operational health service 107 determines whether the current configuration matches the desired configuration. If so, at step 806, operational health service 107 sets the configuration status to the running state. If not, at step 808, operational health service 107 determines whether the current configuration is ephemeral. If so, at step 810, operational health service 107 sets the configuration status to configuring/removing state. If not, at step 812, operational health service 107 sets the configuration status to the error state. Method 800 can loop to continually monitor current configuration of SDDC 502 against the desired configuration.

Figure 9:
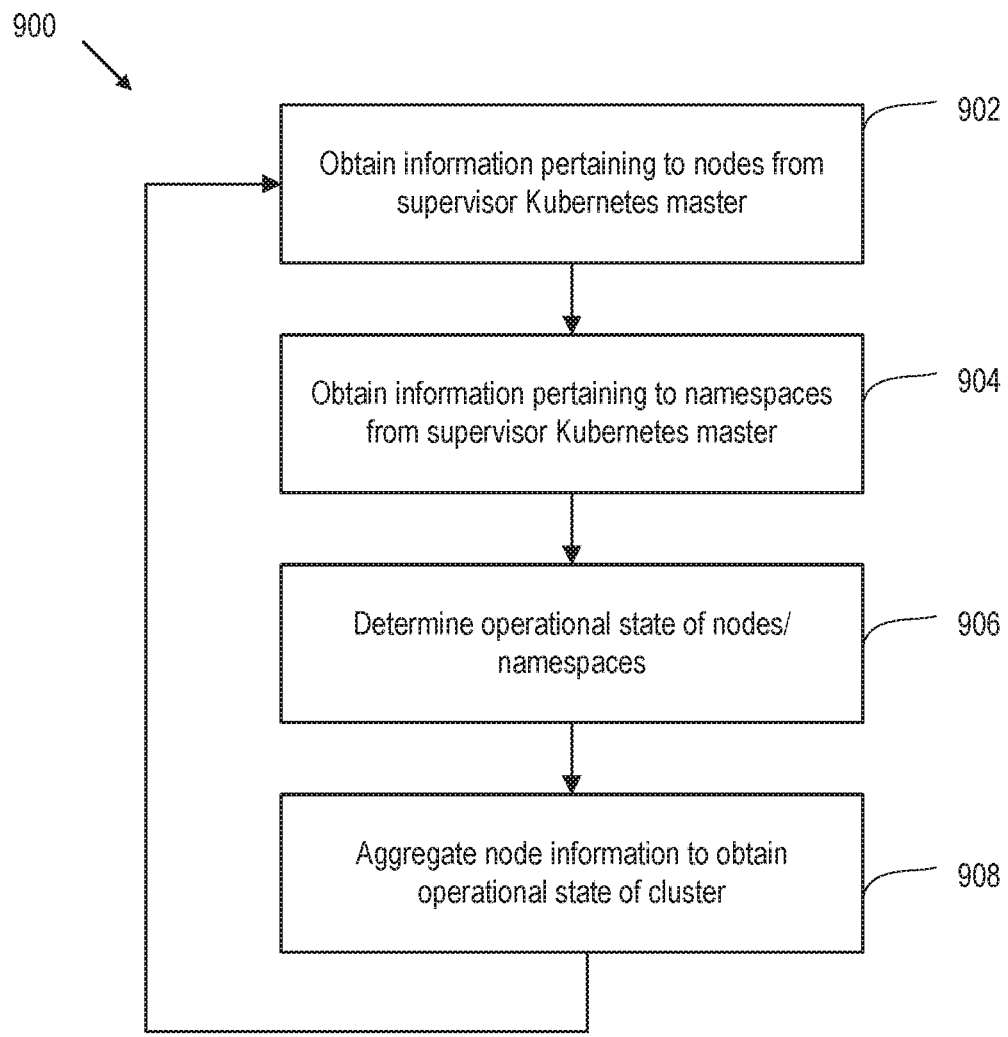
FIG. 9 is a flow diagram depicting a method of determining operational status of a Kubernetes system executing in a supervisor cluster according to an embodiment.

FIG. 9 is a flow diagram depicting a method 900 of determining operational status of a Kubernetes system executing in a supervisor cluster 101 according to an embodiment. Method 900 can be performed by operational health service 107 executing on CPU, memory, storage, and network resources managed by a virtualization layer (e.g., a hypervisor) or a host OS.

Method 900 begins at step 902, where operational health service 107 obtains information pertaining to nodes from supervisor Kubernetes master 104 (e.g., using kubectl get node or kubectl describe node). At step 904, operational health service 107 obtains information pertaining to namespaces from supervisor Kubernetes master 104 (e.g., using kubectl get namespace or kubectl describe namespace). At step 906, operational health service 107 determines operational state of the nodes/namespaces from the collected information (e.g., ready, not ready, unknown). At step 908, operational health service 107 aggregates node information to obtain operational state of the Kubernetes cluster (e.g., ready, not ready, unknown).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of determining operational health of a virtualized computing system, comprising:
   receiving, at a service executing in the virtualized computing system, first status messages from software components of the virtualized computing system;
   determining, by the service, a current configuration of a software-defined data center (SDDC) with respect to a desired state based on the first status messages, the desired state including: a host cluster having hosts executing hypervisors thereon;
   a software-defined (SD) network deployed in the host cluster; shared storage accessible by the host cluster; a virtual infrastructure (VI) control plane managing the host cluster, the SD network, and the shared storage; and an orchestration control plane integrated with the hypervisors and the VI control plane and executing an application management system;
   receiving, at the service, second status messages from the orchestration control plane indicative of an operational status of the application management system;
   determining, by the service, at least one measure of the operational health in response to a configuration status for the current configuration of the SDDC and the operational status of the application management system; and
   presenting information about the at least one measure of the operational health, the information prompting a user to remediate one or more of the software components of the virtualized computing system to bring the configuration status and the operational status to target values.

2. The method of claim 1, wherein the hypervisors support execution of virtual machines (VMs), the VMs including pod VMs, the pod VMs including container engines supporting execution of containers in the pod VMs, and wherein the desired state includes:
   a logical network, in the SD network, having at least one logical switch coupled to at least one logical gateway, each of the VMs connected to the logical network;
   at least one master server of the orchestration control plane executing in at least one of the VMs;
   pod VM controllers executing in the hypervisors external to the VMs, the pod VM controllers configured as agents of the at least one master server to manage the pod VMs; and
   at least one storage volume in the shared storage accessible by the VMs.

3. The method of claim 2, wherein the desired state includes:
   image services executing in the hypervisors external to the VMs;
   a container image registry, accessible by the image services through the logical network, configured to store container images for the pod VMs; and
   a registry service, executing in a virtualization management server of the VI control plane, configured to manage the container image registry.

4. The method of claim 1, wherein the configuration status is one of a ready status in response to the current configuration matching the desired state, an error status in response to the current configuration not matching the desired state, and a configuring/removing status in response to the current configuration being ephemeral.

5. The method of claim 1, wherein the hypervisors support execution of virtual machines (VMs), and wherein the service determines the operational status by:
   querying the application management system for status of control nodes and worker nodes executing in the VMs; and
   aggregating the status from the control nodes and the worker nodes to generate a status for a cluster of the control nodes and the worker nodes.

6. The method of claim 1, wherein
   the status messages are associated with types including informational, warning, and error types.

7. The method of claim 6, wherein the at least one measure of the operational health includes:
   a first measure comprising the configuration status with respect to the desired state; and
   a second measure comprising the operational status with respect to the types of the status messages.

8. The method of claim 6, wherein the at least one measure of the operational health includes a combined measure of the configuration status and the operational status with respect to the types of the status messages.

9. The method of claim 1, wherein the step of monitoring the current configuration comprises:
   receiving, at the service, from at least one additional service executing in the VI control plane, status of at least one of the host cluster, one or more of the hosts, the SD network, and the shared storage.

10. The method of claim 1, wherein the step of determining the current configuration comprises:
receiving, at the service, from at least one additional service executing in the VI control plane, status of the at least one additional service.

11. A non-transitory computer readable medium comprising instructions to be executed in a computing device to cause the computing device to carry out a method of determining operational health of a virtualized computing system, comprising:
receiving, at a service executing in the virtualized computing system, first status messages from software components of the virtualized computing system;
determining, by the service, a current configuration of a software-defined data center (SDDC) with respect to a desired state based on the first status messages, the desired state including: a host cluster having hosts executing hypervisors thereon; a software-defined (SD) network deployed in the host cluster; shared storage accessible by the host cluster; a virtual infrastructure (VI) control plane managing the host cluster, the SD network, and the shared storage; and an orchestration control plane integrated with the hypervisors and the VI control plane and executing an application management system;
receiving, at the service, second status messages from the orchestration control plane indicative of an operational status of the application management system;
determining, by the service, at least one measure of the operational health in response to a configuration status for the current configuration of the SDDC and the operational status of the application management system; and
presenting information about the at least one measure of the operational health, the information prompting a user to remediate one or more of the software components of the virtualized computing system to bring the configuration status and the operational status to target values.

12. The non-transitory computer readable medium of claim 11, wherein the hypervisors support execution of virtual machines (VMs), the VMs including pod VMs, the pod VMs including container engines supporting execution of containers in the pod VMs, and wherein the desired state includes:
a logical network, in the SD network, having at least one logical switch coupled to at least one logical gateway, each of the VMs connected to the logical network;
at least one master server of the orchestration control plane executing in at least one of the VMs;
pod VM controllers executing in the hypervisors external to the VMs, the pod VM controllers configured as agents of the at least one master server to manage the pod VMs; and
at least one storage volume in the shared storage accessible by the VMs.

13. The non-transitory computer readable medium of claim 11, wherein the configuration status is one of a ready status in response to the current configuration matching the desired state, an error status in response to the current configuration not matching the desired state, and a configuring/removing status in response to the current configuration being ephemeral.

14. The non-transitory computer readable medium of claim 11, wherein the hypervisors support execution of virtual machines (VMs), and wherein the service determines the operational status by:
querying the application management system for status of control nodes and worker nodes executing in the VMs; and
aggregating the status from the control nodes and the worker nodes to generate a status for a cluster of the control nodes and the worker nodes.

15. The non-transitory computer readable medium of claim 11, wherein
the status messages are associated with types including informational, warning, and error types.

16. The non-transitory computer readable medium of claim 15, wherein the at least one measure of the operational health includes:
a first measure comprising the configuration status with respect to the desired state; and
a second measure comprising the operational status with respect to the types of the status messages.

17. The non-transitory computer readable medium of claim 15, wherein the at least one measure of the operational health includes a combined measure of the configuration status and the operational status with respect to the types of the status messages.

18. A virtualized computing system, comprising:
a software-defined data center (SDDC); and
a virtualization management server configured to manage the SDDC, the virtualization management server configured to execute an operational health service configured to:
receive first status messages from software components of the SDDC;
determine a current configuration of the SDDC with respect to a desired state based on the first status messages, the desired state including: a host cluster having hosts executing hypervisors thereon; a software-defined (SD) network deployed in the host cluster; shared storage accessible by the host cluster; a virtual infrastructure (VI) control plane managing the host cluster, the SD network, and the shared storage; and an orchestration control plane integrated with the hypervisors and the VI control plane and executing an application management system;
receive second status messages from the orchestration control plane indicative of an operational status of the application management system; and
determine at least one measure of the operational health in response to a configuration status for the current configuration of the SDDC and the operational status of the application management system; and
present information about the at least one measure of the operational health, the information prompting a user to remediate one or more of the software components of the virtualized computing system to bring the configuration status and the operational status to target values.

19. The virtualized computing system of claim 18, wherein the configuration status is one of a ready status in response to the current configuration matching the desired state, an error status in response to the current configuration not matching the desired state, and a configuring/removing status in response to the current configuration being ephemeral.

20. The virtualized computing system of claim 18, wherein the hypervisors support execution of virtual machines (VMs), and wherein the operational health service is configured to:

query the application management system for status of control nodes and worker nodes executing in the VMs; and aggregate the status from the control nodes and the worker nodes to generate a status for a cluster of the control nodes and the worker nodes.

\* \* \* \* \*